UNITED STATES PATENT OFFICE.

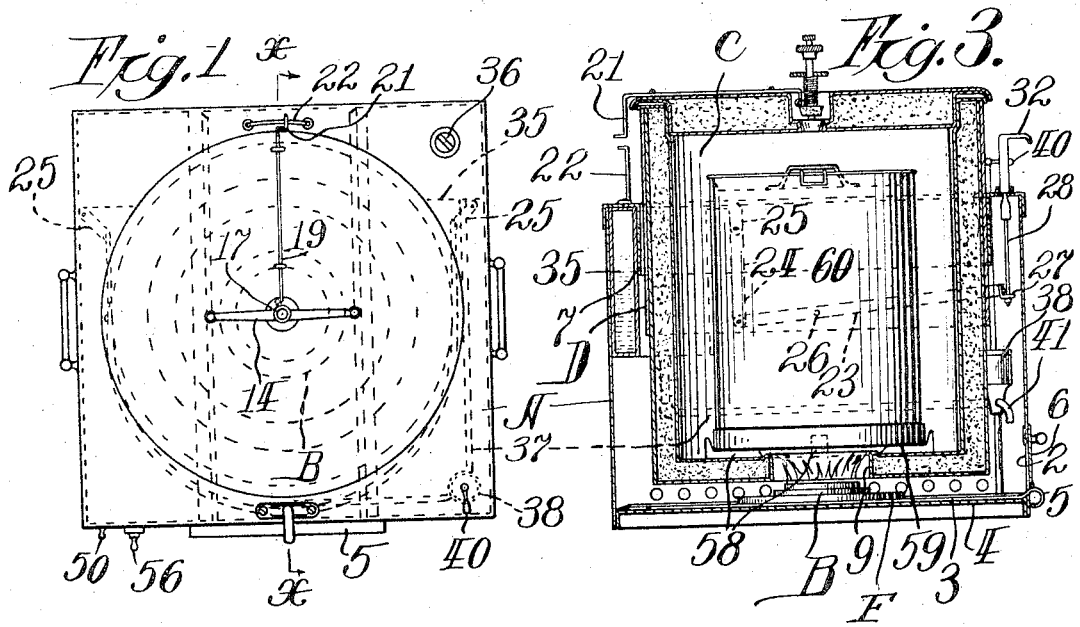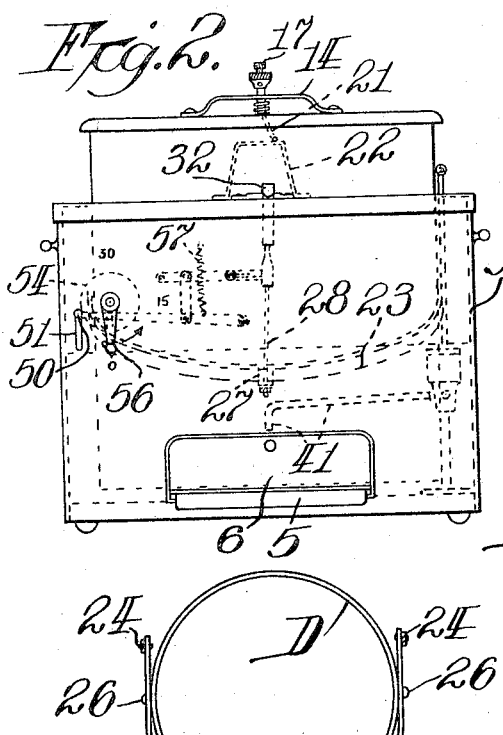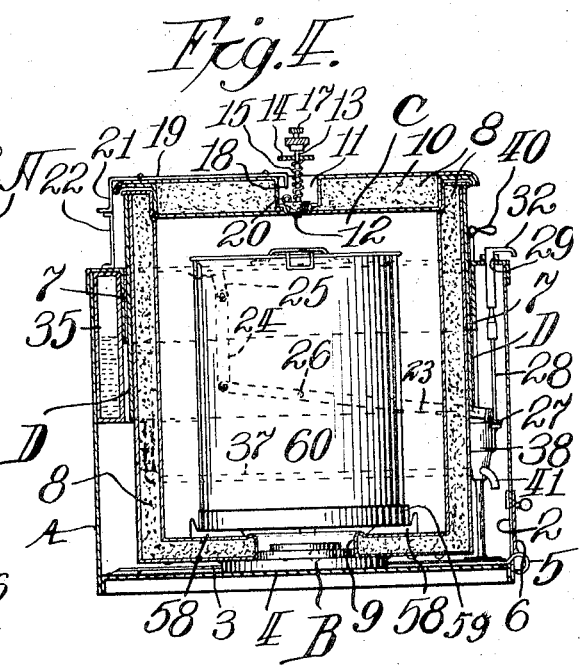

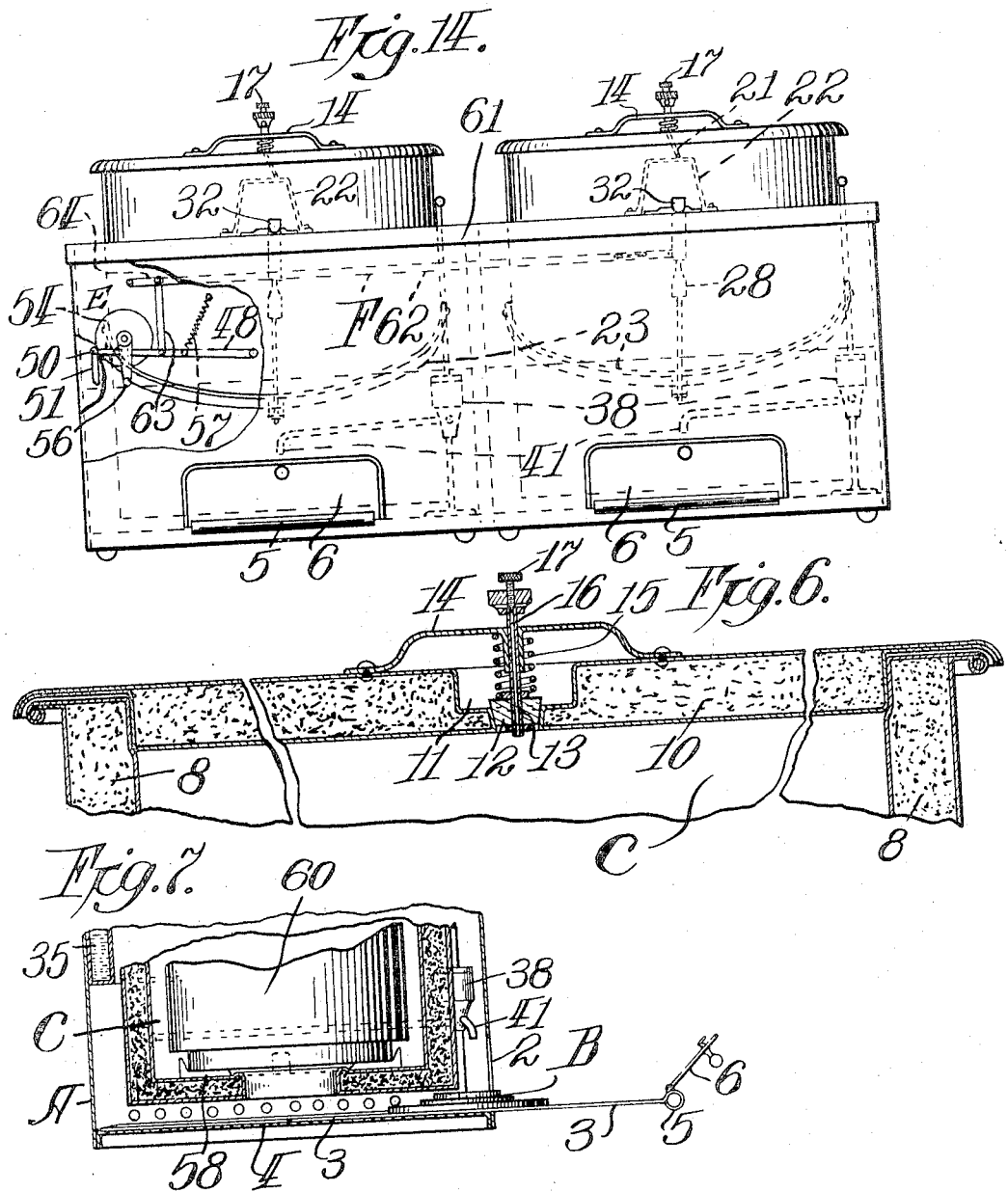

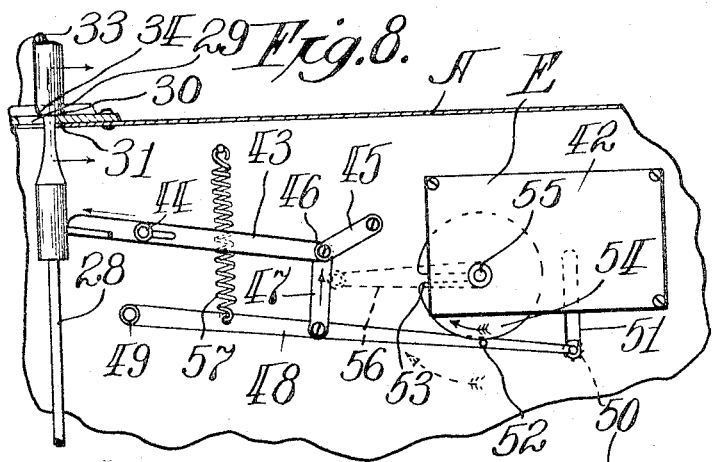
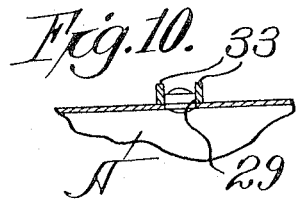
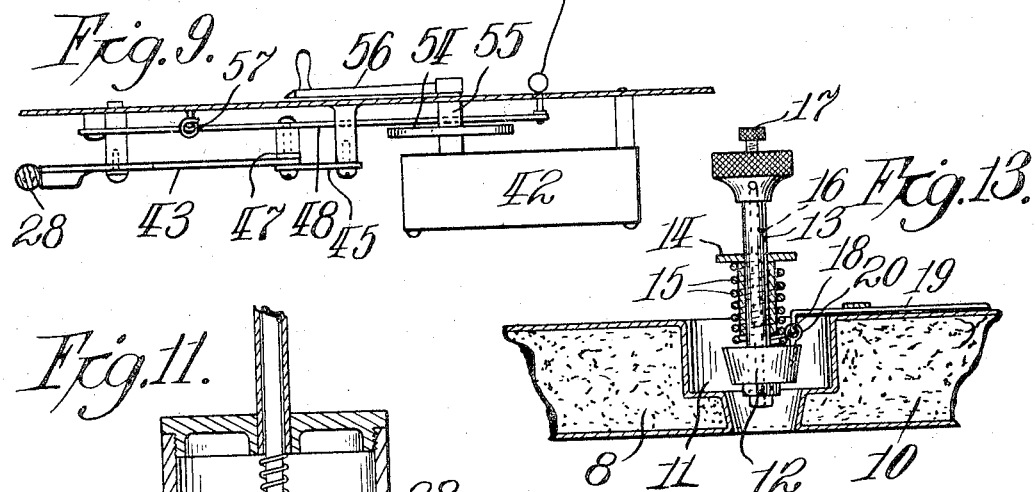
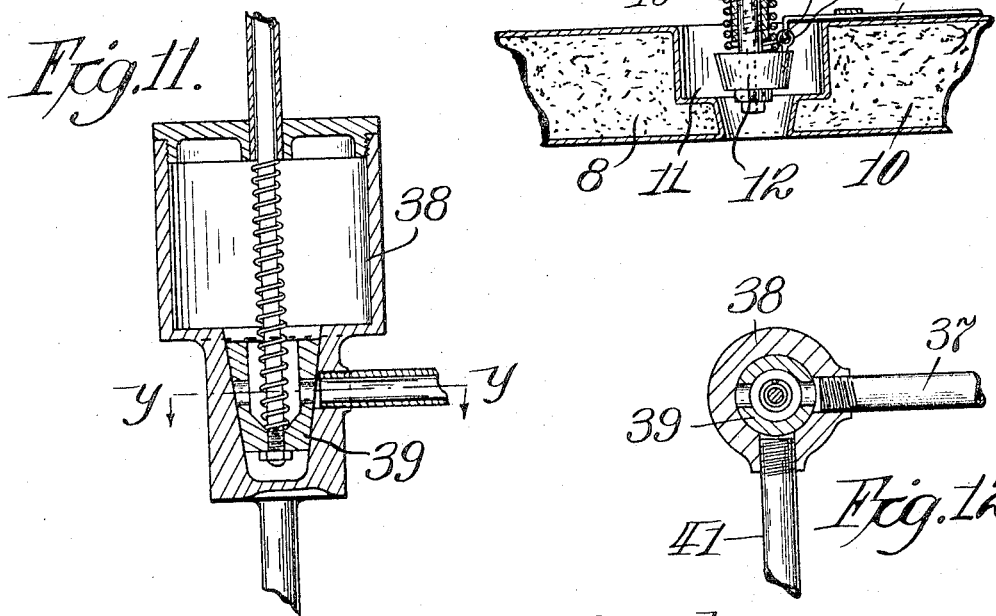
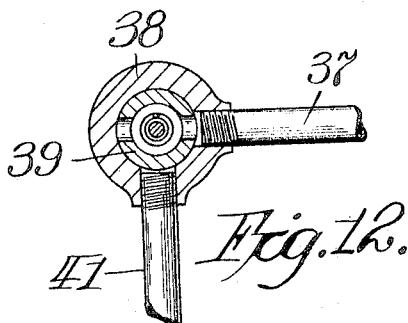

ROSS M. G. PHILLIPS, OF MINNEAPOLIS, MINNESOTA.

COOKING APPARATUS.

1,102,796.

Specification of Letters Patent. Patented July 7, 1914.

Application filed July 20, 1912. Serial No. 710,630. REISSUED

*To all whom it may concern:*

Be it known that I, ROSS M. G. PHILLIPS, a citizen of the United States, residing at Minneapolis, in the county of Hennepin and State of Minnesota, have invented a new and useful Improvement in Cooking Apparatus, of which the following is a specification.

The object of this invention is the production of a portable cooker having means whereby it can be used with or without a fire.

Further objects are, automatic control of the fire which is used and of the draft passage therefor, simplicity of construction and effectiveness and convenience in use.

Heretofore it has been usual to place a pre-heated stone in portable stoves for cooking purposes or to use a fire in a stove without the stone. With my invention the fire is used for heating the stove and stone together thus producing greater efficiency and economy and avoiding all handling of the stone. After the stone has been heated the device is adapted to be used effectively as a fireless cooker.

In the accompanying drawings forming part of this specification, Figure 1 is a plan view of my invention, Fig. 2 is a front elevation, Fig. 3 is a section on the line X—X, Fig. 1, the parts being shown when in open position, Fig. 4 is a similar section when the parts are in closed position, Fig. 5 is a plan of the supporting sleeve and lever for the insulated receptacle, Fig. 6 is a detail in section showing a portion of the insulated receptacle, Fig. 7 is another detail in section showing the tray as withdrawn to expose the pre-heater for lighting, Fig. 8 is a detail showing part of the timer mechanism for closing the receptacle automatically, Fig. 9 is a plan of the construction illustrated in Fig. 8, Fig. 10 is a section of a detail showing the construction of guides employed for part of the operating arms illustrated in Fig. 8, Fig. 11 is a side view in section of the fuel measuring cup, Fig. 12 is a section upon the line Y—Y, Fig. 11, Fig. 13 is a section of a detail showing the construction of the stopper valve employed in the cover of the receptacle, and Fig. 14 is a front elevation of an alternative construction of my invention.

In the drawings A indicates a suitable outer casing having an open top and formed with a door way 2 near the lower portion of one of its sides. A tray 3 is adapted to slide on the bottom 4 of the casing through the door way, its end 5 projecting below the door 6 in the door way so that it can be used as a handle to draw the tray out or push it into the casing. This tray is adapted to carry a pre-heater B of suitable construction such as an alcohol stove. The rim of the casing extends inwardly and is turned down to form a centrally disposed depending cylindrical wall 7 in which an insulated food-container or receptacle C is adapted to move freely. This receptacle has a double side and bottom wall, the space between the adjacent inner faces of said walls being filled with a suitable poor heat conducting material 8 such as ground cork. The bottom of the receptacle is formed with a centrally disposed opening or ingress draft-passage 9 fitting over the pre-heater B and its top is closed by a removable cover 10 having double walls spaced apart for insulating purposes. The burner B is provided with a circular sealing and insulating pad F made of asbestos or equivalent material and considerably larger in diameter than the ingress draft-passage 9 in the food-container, so that when the same is brought in its descent to a bearing upon the said pad, the said pad not only closes and seals the ingress draft-passage 9, but also insulates the food-container and thus retards the radiation of heat therefrom.

The cover is provided with an egress draft passage 11 which is adapted to be closed by an automatically operated valve 12 said valve being formed with a stem 13 sliding freely through the handle 14. An expansion spring 15 compressed between the handle and valve proper tends to keep the valve in closed position. The valve stem and valve proper are formed with a vent opening 16 for steam from within the receptacle which can be closed by a thumb screw 17 (see Fig. 6). The valve is held in open position by a hook 18 having a shaft 19 journaled in supports on the top of the cover, said hook being adapted to engage in an eye 20 carried by the valve. The outer end of the shaft is formed with a depending arm 21 hanging from the edge of the cover and adapted to impinge against the bracket 22 fixed on the top of the casing to disengage the catch from the valve when the receptacle C lowers from superior position as shown in Fig. 3, to closed position as shown in Fig. 4. The said valve 12 must be manually set after the cover 10 has been placed upon the food-container C and the same has been suspended in spaced relation to the pre-heater B by means of the spacing-mechanism to be described later on. But the action of the said valve in closing is automatic.

The receptacle or food-container C is adapted to be seated in a sleeve D which in turn is supported freely within the wall 7 by a yoke or forked lever 23 fulcrumed by links 24 which are pivoted to the ends of the fork and to brackets 25 secured to the top of the casing. The lever is pivoted adjacent its ends at diametrically opposite points 26 to the side of the sleeve D. The body portion of the lever is secured freely by an angle 27 to the vertically movable supporting or lifting rod 28. This rod depends freely through an opening 29 (see Fig. 8) in the top wall of the casing and is formed with a catch shoulder 30 adapted to engage over the edge 31 of said opening to hold the body of the lever up and the receptacle in superior or spaced position so that a draft opening is formed between the pre-heater and receptacle. The upper end of the rod 28 is provided with a lifting handle 32 by which the rod can be raised. Guides in the form of flanges 33 (see Fig. 10) on the side edges of the opening 29 limit side movement of the rod 28 and prevent the shoulder 30 from engaging over the edge of said opening except on one side. A portion 34 of the shoulder 30 also serves for the same purpose. The mechanism just above described for the suspension of the food-container, constitutes a spacing mechanism since its function is to maintain the food-container in spaced relation to the preheater during the heat-charging period.

A fuel tank 35 is supported in the space between the outer wall of the casing and the inner wall 7 and has a plugged filling opening 36 for alcohol and a supply pipe 37 leading to a measuring cup 38 by which the desired amount of alcohol may be gaged for use in the heater. A valve 39 (see Figs. 2, 3, 4 and 11) controlled by handle 40 is adapted to open the cup through the nozzle 41 and discharge a supply of fuel to the preheater when the latter has been drawn out by the tray 3 through opening 2 into the position shown in Fig. 7. The valve 39 is adapted when in normal position of the handle to open the supply pipe 37 and close the nozzle and vice versa when turned to close the supply pipe to open the nozzle.

The timing mechanism E is adapted to release the lever 23 and drop the receptacle and employs a clock work mechanism 42 of ordinary construction. This mechanism pushes the rod 28 out of engagement with edge 31 at a predetermined time by push rod or latch 43 which is slidingly and pivotally mounted on the pin 44 on the wall of the casing A. The push rod 43 coöperates with a link 45 to form a pair of toggle levers the connected ends of which being pivoted at 46 to an actuating link 47. This link is pivotally mounted on an arm or tripping-lever 48 one end of which is fulcrumed at 49 on casing A and its free end provided with a handle 50 projecting through and movable in a slot 51 in the casing. Near the free end of the arm 48 is a stop or timing-pin 52 adapted to drop into the notch 53 in the periphery of the stop or timing-disk or wheel 54 carried by the main drive shaft 55 of the clock work mechanism.

The winding crank handle or setting-lever 56 on shaft 55 is adapted to be moved in the direction indicated by arrows in Figs. 2 and 8 a portion of a turn according to the length of time the preheater is to be operated, the degree of turn as illustrated being marked "15" and "30" (indicating minutes) upon the casing A. The rod 28 after this operation is then raised into the position indicated in Fig. 8, the valve 12 is opened and the preheater ignited. The clock work mechanism turns the shaft 55 until the stop 52 engages notch 53 and stops the clock work mechanism. As stop 52 engages notch 53 the rod 28 is disengaged from edge 31 allowing the receptacle to drop by gravity and close the opening 9. The closing movement of the receptacle releases the hook 18 from engagement with eye 20 thus permitting valve 12 to close automatically.

The arm 48 is drawn upwardly by a spring 57 and before setting the timer E the handle 50 is pressed down to disengage the stop 52 from notch 53 in disk 54. A stand 58 of skeleton form is placed in the bottom of the receptacle upon which a heat conserver 59 is placed and held in central position, said conserver consisting of soap stone or metal as desired and being spaced from the opening 9 to admit of a draft passage from the pre-heater into the receptacle. A cooking utensil 60 of any desired form may be employed in the receptacle. To open the device the cover is removed and the receptacle can be lifted out of the sleeve. To forestall, as it were, or anticipate the action of the automatic controlling mechanism as may be for one reason or another sometimes desired, it is only necessary to move the handle 32 laterally from left to right so as to move the lifting rod 28 and disengage the spacing-shoulder 30 from the edge 31 of the opening 29. The weight of the food-container now will cause it to descend into its heat-conserving position in which its draft passages will be closed and the preheater extinguished in advance, as it were, of the tripping-action of the automatic controlling mechanism. In this way the spacing-mechanism fulfils the secondary function of forestalling means to anticipate the releasing action of the automatic time-limiting mechanism.

In the alternative construction shown in Fig. 14, the casing 61 is made to accommodate two receptacles and a single clock work mechanism E is employed to operate both receptacles. A pair of long toggle levers F is connected to the arm 48. This set of levers consists of a push bar 62 which is slidingly mounted on the casing and adapted to disengage the rods 28 simultaneously and is actuated by a link 63 connected pivotally to arm 48 and link 64. This actuating means operates in every way similar to the mechanism described in the preferred form.

In my improved cooker as shown herein, I employ a vertically movable cooking receptacle having an ingress opening at its lower end and an egress opening at its upper end, in combination with means for suspending the said receptacle in an elevated position over a preheater from which it is thus sufficiently separated to form a draft passage between the preheater and the ingress opening in the bottom of the receptacle. This draft passage is eliminated and the ingress passage in the receptacle closed by the descent of the receptacle at a predetermined time following the tripping, so to speak, of the mechanism employed to suspend it in its elevated or heat-charging position. As herein shown, also, I utilize the descent of the receptacle for the actuation of means for closing and sealing the egress opening at its upper end at the time it descends into its heat-conserving position. The preheater or burner, whatever its character may be, is carried, as shown, by a horizontally movable tray or slide mounted in the casing of the cooker and located below the plane of the bottom of the receptacle. When the cooker is in its suspended or heat-charging position and the tray is in its closed position, a draft-passage is formed between the preheater and the ingress opening in the bottom of the said receptacle the descent of which eliminates the said draft-passage and closes the said ingress-opening. When the said receptacle is in its said suspended position the tray may be drawn outward from under the receptacle or retracted to expose the preheater for lighting the same, after which it is pushed back into place under the receptacle. This lateral movement of the tray and preheater can take place only when the receptacle is in its elevated or heat-charging position. When the receptacle is in its lowered or heat-conserving position it rests upon and is supported by the preheater which then closes its ingress opening and so conserves its heat.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

I do not in this case claim in a cooking apparatus of the character shown and described, means for automatically supplying fuel to the preheater and automatically cutting off such supply, those features being claimed in my copending application filed December 21, 1912, Serial No. 737,993, which shows but does not broadly claim, the typical apparatus shown and described herein.

Having described my invention, what I claim as new and desire to protect by Letters Patent is:

1. In a cooking apparatus, the combination with a food-container having ingress and egress draft-passages, of a preheater, one of the said parts being movable with respect to the other for the creation and closure of a draft-space between them, a spacing mechanism for holding the said movable part in spaced relation to the other part, and means for automatically controlling the releasing function of the said spacing mechanism.

2. In a cooking apparatus, the combination with a food-container having ingress and egress draft-passages and adapted to receive a radiator, of a preheater, one of the said parts being movable with respect to the other for the creation and closure of a draft-space between them, spacing-mechanism for holding the said movable part in spaced relation to the other part, and means for automatically controlling the releasing function of the spacing-mechanism.

3. In a cooking apparatus, the combination with a food-container having ingress and egress draft-passages, of a preheater adapted to act as a closure for the said ingress passage, the said parts being movable with respect to each other for the creation and closure of a draft-space between them, spacing mechanism for holding the said movable part in spaced relation to the other part, and means for automatically controlling the releasing function of the said spacing-mechanism.

4. In a cooking apparatus, the combination with a vertically movable food-container formed at its lower end with an ingress draft-passage, of a preheater adapted to act as a closure for the said ingress draft-passage, spacing-mechanism for holding the food-container above the preheater in spaced relation thereto, and means for automatically controlling the function of the spacing-mechanism in releasing the container which descends upon the preheater for the closing of its said shaft ingress passage.

5. In a cooking apparatus, the combination with a food-container having ingress and egress draft-passages, of a preheater adapted to act as a closure for the said ingress draft-passage, one of the said parts being movable with respect to the other, spacing-mechanism for holding the said movable part in spaced relation to the other part, means for automatically controlling the releasing function of the spacing mechanism, and means for automatically closing the said egress draft-passage when the container and preheater are moved together.

6. In a cooking apparatus, the combination with a food container having an ingress draft-passage, of a preheater adapted to act as a closure for the said ingress draft-passage, one of the said parts being movable with respect to the other, spacing-mechanism for holding the container and preheater in spaced relation, means for automatically controlling the releasing function of the spacing-mechanism, and means for insulating the container and preheater when moved together for the closure of the said ingress draft-passage.

7. In a cooking apparatus, the combination with a food-container having an ingress draft-passage and a preheater adapted to constitute a closure for the said passage, one of the said parts being movable with respect to the other for the creation and closure of a draft-space between them, and the preheater being also movable into a lighting position; of a spacing-mechanism for holding the said movable part in spaced relation to the other part, and means for automatically controlling the releasing function of the spacing-mechanism.

8. In a cooking apparatus, the combination with a food-container having an ingress draft-passage, of a laterally movable preheater adapted to act as a closure for the said passage one of the said parts being movable with respect to the other for the creation and closure of a draft-space between them, spacing-mechanism for holding the said container and preheater in spaced relation, means for automatically controlling the releasing function of the spacing-mechanism, and means for moving the preheater laterally with respect to the container into its lighting position.

9. In a cooking apparatus, the combination with a food-container having ingress and egress draft-passages, of a preheater adapted to close the said ingress draft-passage one of the said parts being movable with respect to the other, spacing-mechanism for holding the said container and preheater in spaced relation, means for automatically controlling the releasing function of the said spacing-mechanism, and an insulating member carried by the said preheater and insulating the same from the container when the two parts are closed together for the closure of the said ingress draft-passage.

10. In a cooking apparatus, the combination with a vertically movable food-container having an ingress and an egress draft-passage, of a preheater adapted to close the said ingress draft-passage, spacing-mechanism for holding the container in spaced relation above the pre-heater, means for automatically controlling the releasing function of the spacing-mechanism, and means controlled by the descent of the container for automatically closing the egress draft passage thereof concurrently with the closing of the ingress passage thereof by the preheater.

11. In a cooking apparatus, the combination with a casing, of a vertically movable food-container having ingress and egress draft-passages, a laterally movable tray, a preheater thereupon adapted to close the ingress draft-passage of the container and moved into its lighting position outside of the said casing when the tray is retracted therefrom, spacing-mechanism for holding the container in spaced relation above the preheater, and means for automatically controlling the releasing function of the spacing-mechanism for the descent of the container upon the preheater.

12. In a cooking apparatus, the combination with a vertically movable food-container having ingress and egress draft-passages, of a preheater adapted to act as a closure for the said ingress passage, spacing-mechanism for holding the said container in spaced relation above the preheater, the said mechanism including a vertically movable handle, and automatic means coöperating with the said handle for releasing the container to permit its descent for the closure of its draft-passage by the preheater.

13. In a cooking apparatus, the combination with a vertically movable food-container having an ingress draft-passage in its lower end, of a preheater adapted to act as a closure for the said draft-passage, spacing-mechanism for holding the container in spaced relation above the preheater, the said spacing-mechanism including a lever and a vertically movable handle, and automatic means co-acting with the said handle for releasing the container to permit its descent for the closure of its ingress draft-passage by the preheater.

14. In a cooking apparatus, the combination with a casing, of a vertically movable food-container having an ingress draft-passage in its lower end, a tray laterally movable in the said casing and provided at its outer end with a door, a preheater carried by the said tray and adapted to act as a closure for the said ingress draft-passage of the container, spacing-mechanism for holding the container in spaced relation above the preheater, and means for automatically controlling the releasing function of the spacing-mechanism.

15. In a cooking apparatus, the combination with a vertically movable food-container having an ingress draft-passage at its lower end and an egress draft-passage in the cover provided for its upper end, of a preheater adapted to act as a closure for the said ingress draft-passage, spacing-mechanism for holding the container in spaced relation above the preheater, means for automatically controlling the releasing function of the spacing-mechanism, a valve for closing the said egress draft-passage, and means for automatically closing the said valve upon the descent of the food-container.

16. In a cooking apparatus, the combination with a casing, of a vertically movable food-container having an ingress draft-passage in its lower end and provided with a removable cover having an egress draft-passage, of a preheater adapted to act as a closure for the said ingress draft-passage, spacing-mechanism for holding the container in spaced relation above the preheater, means for automatically controlling the releasing function of the said spacing-mechanism, a valve for the said egress draft-passage, means mounted upon the cover of the container for carrying the said valve, and means for automatically closing the said valve concurrently with the descent of the container for the closure of its ingress draft-passage by the said preheater.

17. In a cooking apparatus, the combination with a food-container having ingress and egress draft-passages, of a sleeve in which the said container is suspended, a preheater adapted to act as a closure for the said ingress draft-passage, spacing-mechanism for lifting the said sleeve and container and holding the same in spaced relation above the preheater, means for automatically controlling the releasing function of the spacing-mechanism, and means for closing the egress openings of the container when the same is released for the closure of its ingress draft-passage.

18. In a cooking apparatus, the combination with a casing, of a vertically movable food-container having an ingress draft-passage in its lower end and provided with a removable cover having an egress draft-passage, a preheater adapted to act as a closure for the said ingress draft-passage, spacing-mechanism for holding the container in spaced relation above the preheater, means for automatically controlling the releasing function of the said spacing-mechanism, a vented valve for the said egress draft-passage, and a lever mounted upon the said cover, carrying the said vented valve and engaged by a part of the casing for automatically closing the said valve upon the descent of the container for the closure of its ingress draft-passage by the preheater.

19. In a cooking apparatus, the combination with a casing, of a vertically movable food-container having an ingress draft-passage in its lower end and provided with a removable cover having an egress draft-passage, a preheater acting as a closure for the said ingress draft-passage and laterally movable into a lighting position outside of the casing, spacing-mechanism for holding the container in spaced relation above the preheater, means for automatically controlling the releasing function of the spacing-mechanism, and means for automatically closing the egress passage in the cover of the container when the same descends for the closure of its ingress draft-passage by the preheater.

20. In a cooking apparatus, the combination with a casing, of a food-container and a preheater one of which parts is movable with respect to the other for the creation and closure of a draft space between them, spacing-mechanism for holding the said movable part in spaced relation to the other part, means for automatically controlling the releasing function of the spacing-mechanism, and means for manually forestalling the action of the said automatic means in releasing the said spacing-mechanism.

21. In a cooking apparatus, the combination with a casing, of a vertically movable food-container, a preheater, spacing-mechanism for holding the said container in spaced relation above the said preheater for the creation and closure of a draft-space between them, means for automatically controlling the releasing function of the said spacing-mechanism, and means for manually forestalling the action of the said automatic mechanism in releasing the container.

22. In a cooking apparatus, the combination with a casing, of a vertically movable food-container having ingress and egress draft-passages, a laterally movable preheater adapted to act as a closure for the said ingress draft-passage, spacing-mechanism for holding the said container in spaced relation above the preheater, means for automatically controlling the releasing function of the spacing-mechanism, a fuel reservoir located within the casing, and means for supplying fuel to the preheater from the said reservoir when the preheater is moved laterally with respect to the container.

23. In a cooking apparatus, the combination with a food-container having ingress and egress draft-passages, of a preheater adapted to act as a closure for the said ingress draft-passage, spacing-mechanism for holding the said container in spaced relation above the preheater, means for automatically controlling the releasing function of the said spacing-mechanism and including a setting-lever, a slotted disk, a spring for actuating the same, a tripping-lever carrying a member co-acting with the edge of the said disk and entering the slot thereof, and means for actuating the said tripping-lever when so released.

In testimony whereof, I have signed my name to this specification in the presence of two subscribing witnesses.

ROSS M. G. PHILLIPS.

Witnesses:
H. L. FISCHER,
G. H. DEEBACH.